Patented July 25, 1950

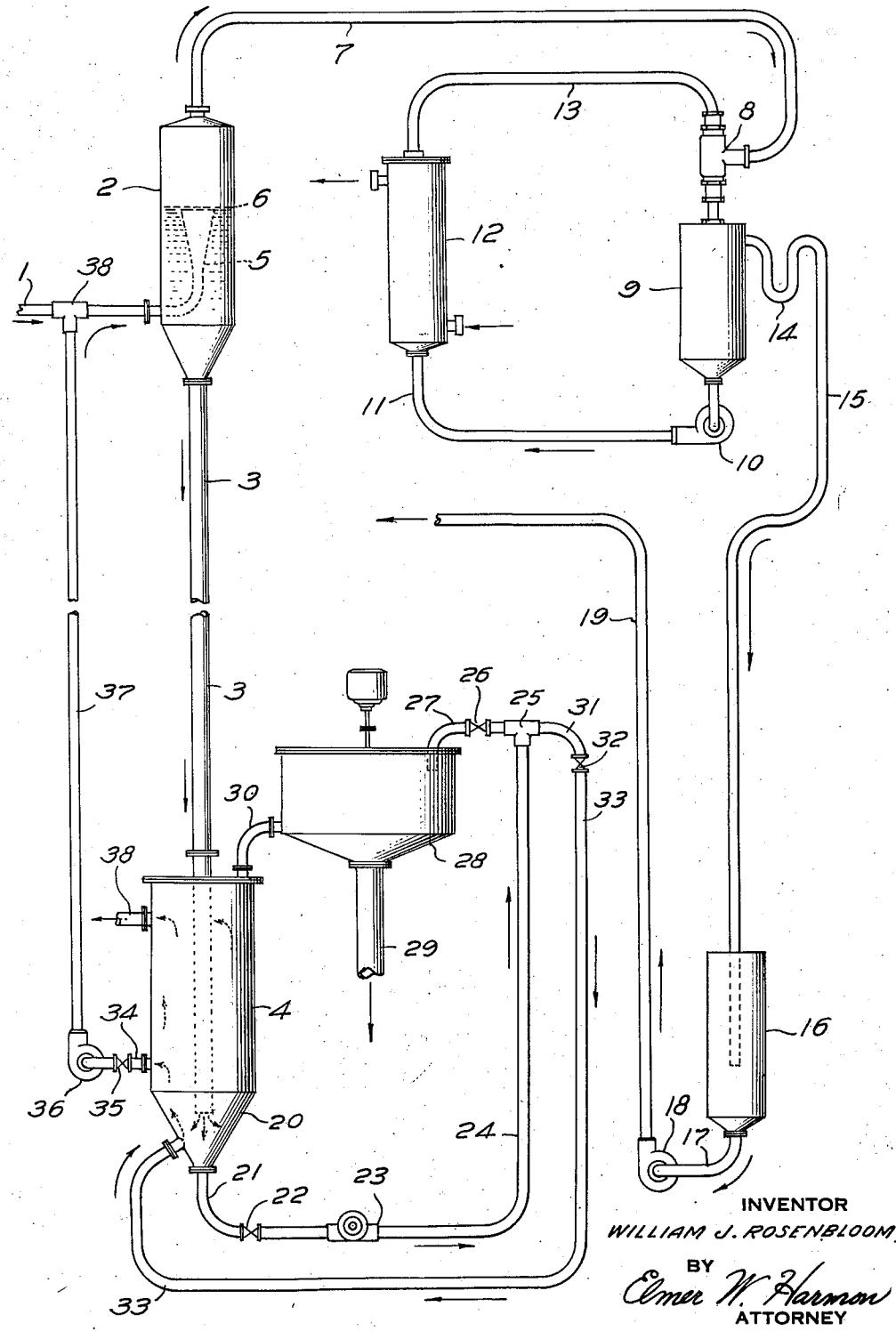

2,516,832

UNITED STATES PATENT OFFICE 2,516,832

SEPARATION OF CRYSTALS FROM SOLUTIONS CONTAINING HCN

William J. Rosenbloom, White Plains, N. Y., assignor to American Cyanamid Company, New York, N. Y., a corporation of Maine Application April 24, 1947, Serial No. 743,673

2 Claims. (Cl. 23—295)

This invention relates to the precipitation of soluble solid material from solution. More particularly, it is concerned with an improved process and apparatus for evaporating and/or cooling solutions sufficiently to cause precipitation and especially adapted to control the crystal growth of precipitated material.

In commercial operation the problem of removing soluble material from solution is frequently encountered. Often the solutions are warm or hot and frequently they have a high solute content. A commonly-used procedure for recovering the solute in such cases is to evaporate and/or cool the solution by the application of vacuum thereto. The resultant concentration and temperature drop produce precipitation of the solute.

The process, though widely used, particularly where further heating of the solution is undesirable, suffers from a number of drawbacks. Among the most troublesome is crystal growth on the inner walls of the apparatus and conduits, reducing their capacity and eventually clogging the latter. This is particularly unfortunate since in many applications of the procedure continuous operation is highly desirable. A concomitant problem is encountered because of the tendency of such operation to produce very small crystals. This is particularly undesirable in those cases where the crystal product tends to dust badly.

In the past, a number of proposals for overcoming these difficulties have been encountered. Probably the most successful has consisted in so operating the evaporator as to attempt to produce a supersaturated liquor, rather than a crystal slurry. In this way, by seeding the solution, after transfer to other suitable apparatus, crystallization can be made to occur at the desired point, and, to some extent, to the desired sizes. Actually, these conditions are exceedingly difficult to maintain in operation and eventually crystallization in the evaporator and conduits always occurs. Further, the crystal growth from the saturated or supersaturated solution still tends to produce relatively small crystals. To overcome this small crystal trouble requires either a very complicated crystallizing system or some recrystallizing system.

It is, therefore, the principal object of the present invention to provide a process and apparatus which are not subject to these difficulties of uncontrolled crystallization and small sizes of crystals. The process should be one capable of extended operation of operating with a minimum of personal supervision, and capable of discharging only crystals of a suitable size for commercial utilization. Preferably, too, the apparatus should be simply and readily adapted from standard commercially available units.

In general, the objects of the present invention have been simply and effectively met. A crystal-recirculating system is incorporated into closed circuit with the evaporator. In this circuit, the evaporator discharges to a crystal-selector-storage vessel. From the bottom of the latter a substantially constant flow of crystal-bearing slurrry is drawn and the bulk of this flow is reintroduced at a level slightly higher in the vessel to produce an upward and tangential flow therein. This flow is sufficient to maintain a solids suspension in the crystal-selector such that only the larger-sized crystals can settle therethrough to the bottom. A part of the flow is periodically diverted to a crystal separator, the crystals being collected as product and the clear liquor being returned to the vessel. A second slurry containing the smaller sized crystals is continuously withdrawn from an upper level in the agitated zone and admixed with the feed entering the evaporator. Flow of this second slurry is sufficient in volume to cool the feed temperature to a few degrees above that in the evaporator. Clear liquor from which all crystals have settled is drawn from the top of the crystallizer.

The major features of the present invention may be more readily described in conjunction with the accompanying drawing. The latter constitutes a schematic flow sheet showing, in simplified form, the essential elements of the apparatus combination and the flows used in the process of the present invention.

Although not limited thereto, the present invention is of particular utility in treating those liquors in which there is not only solute to be recovered but, also, a component is present in the system which is more volatile than the principal solvent. One such condition is encountered in the recovery of ammonium sulfate from aqueous liquors containing HCN in the production of the latter. This situation is more fully discussed in my copending application for U. S. Letters Patent, Serial No. 743,671, filed of even date.

In that application, there is shown a recovery system which is in heat and water balance, permitting efficient separation of ammonium sulfate crystals from a part of the HCN recovery system. Accordingly, for illustrative purposes, the present apparatus will be discussed in conjunction with the treatment of aqueous ammonium sulfate liquor containing dissolved HCN.

As shown in the accompanying drawing, liquor to be evaporated is brought to the circuit of the present invention through a suitable conduit 1. This liquor necessarily will be under sufficient pressure to force it through the apparatus and usually will be under somewhat higher pressure. It may come from any source, usually a storage tank or the like, and the pressure may be applied by direct pumping or pressure on the tank or be due to a gravity head. Such arrangements being conventional, form no part of the present invention, and therefore have not been illustrated.

Liquor, in the illustrative case, aqueous ammonium sulfate liquor containing HCN, delivered through conduit 1, is passed directly into the vacuum-evaporator generally designated 2. From the bottom of evaporator 2, a suitable conduit 3 extends downward to a lower level in some suitable vessel 4 which serves a plurality of functions as a crystallizer-separator-storage tank. As shown in the drawing, the liquid level in tank 4, the length of conduit 3 and the liquor in evaporator 2 will usually constitute a barometric leg as the simplest means of maintaining a substantially constant liquor level 6 in evaporator 2. Within evaporator 2, as indicated in the drawing, an upwardly extending conduit 5 is provided. Therein, evaporation, saturation, supersaturation and crystal growth occur progressively and at increasing rates. This conduit will deliver the incoming liquor at an upper level in the evaporator, somewhat below the liquid level therein.

In order to provide vacuum on the evaporator 2, some evacuating system must be provided. In the case of simple, valueless, non-corrosive or non-poisonous vapors, this can be readily done by a suitable vacuum pump or by a fluid-motivated eductor. Where the vapors contain a valuable and/or poisonous and/or corrosive constituent more volatile than the principal solvent, in the illustrative case the HCN, this problem is more complicated. This is more fully brought out in my copending application for U. S. Letters Patent, Serial No. 743,671, filed of even date. In that application is shown and claimed an eductor system which, for purposes of illustration, is incorporated in the present circuit. However, as noted, where the liquors do not contain such an extraneous volatile component, this part of the circuit may be replaced by a simple evacuation system.

As shown in the drawing, the evacuating system comprises a vapor conduit 7 connecting the top of the evaporator 2 with the side-arm of a fluid-activated eductor 8. Fluid to motivate the eductor is obtained by the novel arrangement of a condensate tank 9 into which the eductor discharges. A suitable liquid pump 10 withdraws condensate from tank 9, forces it through conduit 11, cooler 12 and conduit 13 into the eductor fluid inlet. Thus, the cold motivating fluid is admixed in the eductor with the vapors and performs the necessary condensation. Condensate is removed from tank 9 through a constant level over flow 14, conduit 15 and into a storage tank 16. Since this condensate, when such a system is used will contain a valuable constituent, liquor from tank 16 is withdrawn through conduit 17 by pump 18 and recycled through conduit 19 to some part of the overall circuit, in the illustrative case an HCN washing or absorbing operation, thus returning the desired constituent to the general circuit.

Returning to the crystallizing circuit per se, the drawing indicates a preferred shape for tank 4. It should have a principal section of any desired cross-section and sufficient volume to provide the necessary storage capacity. The lower part of the vessel should preferably decrease in diameter as in the conical lower section 20 to a diameter at the low point about that of a suitable conduit 21 through which crystal-containing slurry is withdrawn. This decrease in diameter is of benefit in establishing a crystal size gradient which will be discussed below. Conduit 21 is usually provided with a suitable valve 22. Slurry is withdrawn through conduit 21 and valve 22 by a suitable pump 23 which discharges the slurry through conduit 24 to a flow divider such as T 25.

From T 25 the flow is divided. Intermittently, in amounts controlled by valve 26, a part of the slurry is diverted through conduit 27 into a suitable crystal-separator 28. In the drawing, this is indicated as a centrifugal separating unit, feed liquor being introduced into the top thereof, crystals being withdrawn from the bottom thereof through conduit 29 to a suitable storage or other disposal system and crystal-free liquor being returned through conduit 30 to a crystalizer 4, preferably at or near the top. While a centrifugal separator has been found highly useful, in operation it may be substituted by some suitable mechanical equivalent. For example, the centrifuge may be replaced by a filter, a screen, a settling tank or other such apparatus adapted to perform the crystal removing function.

Because of the crystal content of this slurry, unless provision is made for continuous flow through conduits 21 and 24, clogging of the conduits and pump 23 is to be expected from the intermittent nature of the centrifugal separator operation. To prevent this, pump 23 is maintained in continuous operation and the bulk of the fluid moved thereby through conduit 24 is diverted from T 25 and returned to tank 4 through conduit 31, valve 32 and conduit 33.

Utilization of the flow through conduit 33 in a novel way constitutes one of the principal features of the present invention. Conduit 33 is connected to a low level in tank 4, preferably, as indicated in the drawing, in the section 20 of diminishing cross-section but above the entry into conduit 21. Return of this flow at a low point in the tank produces definite agitation and a rising current. The latter decreases as the effective diameter of the tank increases from the level of slurry reintroductions. Slurry descending from evaporator 2 through conduit 3 into tank 4, is discharged in this turbulent zone. The effect of these various flows in the turbulent zone produces a size-grading of the crystals in suspension. Only those crystals of sufficient mass to settle against the rising current will fall to the bottom of section 20, the section of decreasing cross-section, and, therefore, only crystals of predetermined size may be carried out through conduit 21 to the centrifugal separating operation.

It will be apparent that, due to the size-grading action of the rising current in tank 4, there will be some liquid level in tank 4 at which crystals too small for other use but of good size for "seeding" will accumulate. At about this level, tank 4 is provided with a discharge conduit 34. Through conduit 34, in amounts controlled by valve 35, pump 36 withdraws a "seed crystal" slurry. This seeding slurry is forced through conduit 37 into a suitable connection such as T 38 in which it is combined with the fresh liquor to be evaporated entering evaporator 2 through conduit 1.

Tank 4 should be of sufficient heighth and capacity, for the flows used therein, that its uppermost levels will contain liquor which has settled substantially free of suspended crystals, the latter having accumulated at lower levels in accordance with their size. Finally, to complete the circuit and dispose of the crystal-free liquor, tank 4 is provided with a fluid discharge conduit 39. The fluid discharge from conduit 39 must be taken out at a level sufficiently high to be roughly within the zone of crystal-free liquor in order to prevent losses in the overall system. This liquor is usually recycled and reused in some other part of the overall system since it will have, even after the evaporation-crystallization of the present invention, a definite solute content. The crystal grading and removing operation of the present invention is used, in effect, as a continuous bleeding system.

Operation of the process of the present invention is clearly apparent from the foregoing discussion. Liquor entering the evaporator-cooler is concentrated sufficiently to precipitate a definite amount of solute. Precipitated-solute slurry descends into a crystallizer-sizer-storage tank in which crystal growth will occur due to the saturated condition of the liquor and the presence in the crystallizer of smaller crystals. The grading action of the upward-rising current permits only crystals of the desired size to be withdrawn to the crystal removing operation. The medium sized crystals remain in the crystallizer until they have grown sufficiently large to fall to the bottom and be discharged. Finer crystals are recycled with feed to the evaporator.

Recycling this fine-crystal slurry into the feed to the evaporator serves a very important double function. First, liquor being fed to the evaporator is at a sufficiently elevated temperature and pressure that if fed directly into the reduced pressure evaporator, large quantities of solvent will flash into vapor. Not only does this tend to produce excessive ebullience, with the resulting entrainment in the vapor discharge conduit of liquid droplets, but such sudden evaporation favors production of only the smallest crystal sizes by sudden precipitation. As shown in the process of my above-identified, copending application, Serial No. 743,671, the temperature of liquid leaving the crystal separator will average about 150° F. It may go as low as 125° F. or approach an upper limit of about 175° F. Liquor entering the system through conduit 1 will vary from about 180-210° F. The fine-crystal slurry, being definitely cooler than the feed liquor is admixed therewith in amount sufficient to reduce the temperature of the liquid entering the evaporator to about 5-10 degrees above the main fluid body temperature therein. This is a definite control of the tendency to flash in the evaporator.

In addition to the temperature-controlling effect, recycling the fine-crystal slurry has an even more important function. In the past, the operation considered preferable for such systems attempted to produce a supersaturated liquid rather than a slurry in the evaporator. As a result, crystallization occurred suddenly in the crystal tank 4 or its equivalent. This not only favored production of small crystals but eventually resulted in clogging the apparatus by crystal growth on the sides thereof, particularly evaporator 2 and conduit 3. Provision of the fine crystals in the feed as done in the present system favors crystal growth on the "seed" crystals rather than precipitation on the walls of the apparatus. This, in turn, is again augmented by the more gradual concentrating effect obtained at the lower feed temperature induced by recycling the cool fine-crystal slurry.

I claim:

1. A crystal forming and selecting process which comprises: passing heated feed liquor into an evaporator, applying vacuum thereto, whereby evaporation, cooling, and solute precipitation is obtained; withdrawing crystal slurry from the evaporator through a barometric leg into an intermediate level in a receiving vessel; continuously withdrawing from the receiving vessel clear solution at a high level, a finer-size crystals slurry at a lower level but about the barometric leg discharge, and a larger-size crystals slurry at the lowest level; combining the finer-size crystals slurry with the incoming feed liquor before the latter enters the evporator; proportioning the feed and finer-size crystals slurry to reduce the temperature of the mixture to 2°-10° F. above the average temperature in the evaporator; passing a portion of the larger-size crystals slurry to a crystal-liquid separator; collecting the separated crystals; returning the crystal-free liquor to receiving vessel; continuously reintroducing the remaining portion of the larger-size crystals slurry into the receiving vessel at a level above that at which said slurry is withdrawn but below the level of discharge of the return flow from the evaporator and below the level at which the finer crystal slurry is withdrawn; and proportioning the flows in the various lines such that finer crystals are continuously being returned from the receiving vessel to the evaporator.

2. A crystal forming and selecting circuit having in combination a first and second tank, connected through a barometric leg; a first conduit extending from the lowest level in said second tank through a pump to a flow divider; a conduit from the flow divider to a solids-liquid separator; a conduit from the solids liquid separator to a high level in said second tank; a conduit extending from the flow divider to a low level in said second tank; a liquid discharge conduit extending from a high level in said second tank, whereby crystal-free liquid is removed from the system; a conduit extending from an intermediate level in the second tank through a pump and then through a flow-combining means and into said first tank at a low level; said first tank having positioned therewithin an inverted, open-top, conical conduit and an L-shaped conduit connecting the low point at the apex of the conical conduit with the conduit extending through the flow-combining means into said first tank a liquid input conduit connected to the flow-combining means, whereby fluid is introduced into the system; and conduit means extending from a high level in the first tank to an evacuator.

WILLIAM J. ROSENBLOOM.

REFERENCES CITED

The following references are of record in the file of this patent:

UNITED STATES PATENTS

| Number | Name | Date |
| --- | --- | --- |
| 1,879,445 | Othmer | Sept. 27, 1932 |
| 1,906,534 | Burke | May 2, 1933 |
| 1,976,936 | Harms | Oct. 16, 1934 |
| 2,013,438 | Fitz | Sept. 3, 1935 |
| 2,037,595 | Schaefer | Apr. 14, 1936 |
| 2,164,111 | Jeremiassen | June 27, 1939 |
| 2,164,112 | Jeremiassen | June 27, 1939 |
| 2,424,205 | Otto | July 15, 1947 |
| 2,424,207 | Otto | July 15, 1927 |

FOREIGN PATENTS

| Number | Country | Date |
| --- | --- | --- |
| 260,691 | Great Britain | Nov. 11, 1926 |